(12) United States Patent
Singer et al.

(10) Patent No.: US 10,950,831 B2
(45) Date of Patent: Mar. 16, 2021

(54) PRESSURE-INDUCED BATTERY PACK VENTING WITH FILTERING

(71) Applicant: INTERNATIONAL BUSINESS MACHINES CORPORATION, Armonk, NY (US)

(72) Inventors: Noah Singer, White Planes, NY (US); Prabjit Singh, Poughkeepsie, NY (US); John G. Torok, Poughkeepsie, NY (US); David C. Long, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 161 days.

(21) Appl. No.: 16/189,011

(22) Filed: Nov. 13, 2018

(65) Prior Publication Data
US 2020/0152930 A1     May 14, 2020

(51) Int. Cl.
*H01M 2/10* (2006.01)
*H01M 10/52* (2006.01)
(Continued)

(52) U.S. Cl.
CPC ....... *H01M 2/1077* (2013.01); *H01M 2/1258* (2013.01); *H01M 2/1264* (2013.01); *H01M 10/52* (2013.01); *H01M 10/653* (2015.04)

(58) Field of Classification Search
CPC combination set(s) only.
See application file for complete search history.

(56) References Cited

U.S. PATENT DOCUMENTS

| 2,331,450 | A | * | 10/1943 | Baum | H01M 6/505 |
| | | | | | 429/65 |
| 2,615,062 | A | * | 10/1952 | Craig | H01M 10/52 |
| | | | | | 429/86 |

(Continued)

FOREIGN PATENT DOCUMENTS

WO   WO 2008/148781 A1   12/2008

OTHER PUBLICATIONS

Feng et al., "Thermal Runaway Features of Large Format Prismatic Lithium Ion Battery Using Extended Volume Accelerating Rate Calorimetry", Journal of Power Sources, vol. 255, pp. 294-301 (2014).

(Continued)

*Primary Examiner* — Kaity V Chandler
(74) *Attorney, Agent, or Firm* — Tihon Poltavets, Esq.; Kevin P. Radigan, Esq.; Heslin Rothenberg Farley & Mesiti P.C.

(57) ABSTRACT

A battery pack is provided which includes an enclosure. The enclosure includes a battery cell compartment and a vent. The battery cell compartment is a sealed compartment, except for the vent, and the vent facilitates pressure-induced venting of gas from the battery cell compartment. One or more battery cells are disposed within the battery cell compartment, and the battery pack also includes a filter system associated with the enclosure. The filter system filters the pressure-induced venting of gas from the battery cell compartment resulting from a thermal runaway event at a battery cell of the one or more battery cells within the battery cell compartment of the enclosure.

17 Claims, 8 Drawing Sheets

(51) Int. Cl.
*H01M 2/12* (2006.01)
*H01M 10/653* (2014.01)

(56) References Cited

U.S. PATENT DOCUMENTS

| | | | | |
|---|---|---|---|---|
| 3,360,403 A | * | 12/1967 | Halsall | H01M 8/00 |
| | | | | 429/86 |
| 3,879,227 A | * | 4/1975 | Hennen | H01M 2/127 |
| | | | | 429/86 |
| 3,899,358 A | * | 8/1975 | Sundberg | H01M 2/1264 |
| | | | | 429/175 |
| 4,048,387 A | | 9/1977 | Lahme et al. | |
| 4,394,423 A | * | 7/1983 | Ledjeff | H01M 10/52 |
| | | | | 429/86 |
| 4,831,011 A | | 5/1989 | Oikawa et al. | |
| 5,464,701 A | * | 11/1995 | Rey | H01M 2/0242 |
| | | | | 429/53 |
| 6,627,345 B1 | * | 9/2003 | Zemlok | H01M 2/204 |
| | | | | 429/99 |
| 8,268,469 B2 | | 9/2012 | Hermann et al. | |
| 9,172,072 B2 | | 10/2015 | Shibata et al. | |
| 10,741,803 B2 | * | 8/2020 | Doyle | H01M 10/6569 |
| 2008/0166275 A1 | | 7/2008 | Riegel et al. | |
| 2012/0070703 A1 | | 3/2012 | Wahl et al. | |
| 2012/0263981 A1 | | 10/2012 | Norden et al. | |
| 2014/0178724 A1 | * | 6/2014 | Saruwatari | H01M 2/1241 |
| | | | | 429/82 |
| 2016/0359154 A1 | | 12/2016 | Harris et al. | |
| 2017/0194675 A1 | * | 7/2017 | Yang | H01M 2/02 |
| 2019/0091498 A1 | * | 3/2019 | Hershberger | B65D 77/067 |

OTHER PUBLICATIONS

Feng et al., "Thermal Runaway Mechanism of Lithium Ion Battery for Electric Vehicles: A Review", Energy Storage Materials (May 2017) 97 pages.

* cited by examiner

PRESSURE-INDUCED BATTERY PACK VENTING WITH FILTERING

BACKGROUND

There are a wide variety of rechargeable batteries available today for use as energy sources, including as backup energy sources. Lithium-ion batteries are one type of rechargeable battery in which lithium ions move from a negative electrode to a positive electrode during discharge and back when charging. An intercalated lithium compound is used in a lithium-ion battery as one electrode material. The electrolyte, which allows for ionic movement, and the two electrodes are constituent components of a lithium-ion battery cell. A cell is a basic electrochemical unit that contains the electrodes, separator and electrolyte. A battery or battery pack is a collection of one or more cells or cell assemblies. These may be ready for use in an electronic system or device by providing an appropriate housing, and electrical interconnections.

Recent events have highlighted the potential for thermal runaway events with the application of lithium-ion-technology-based batteries. A thermal runaway event can be dangerous to anyone or anything nearby at the time of the event.

SUMMARY

Certain shortcomings of the prior art are overcome and additional advantages are provided through the provision, in one or more aspects, of a battery pack, which includes an enclosure. The enclosure includes a battery cell compartment and a vent. The battery cell compartment is a sealed compartment, except for the vent, and the vent facilitates pressure-induced venting of gas from the battery cell compartment. One or more battery cells are disposed within the battery cell compartment, and the battery pack also includes a filter system associated with the enclosure. The filter system filters the pressure-induced venting of gas from the battery cell compartment resulting from a thermal runaway event at a battery cell of the one or more battery cells within the battery cell compartment of the enclosure.

In another aspect, a battery pack is provided which includes an enclosure having a battery cell compartment and a vent. The battery cell compartment is a sealed compartment, except for the vent, and the vent facilitates pressure-induced venting of gas from the battery cell compartment. Multiple battery cells are disposed within the battery cell compartment, and a filter system is associated with the enclosure. The filter system filters the pressure-induced venting of gas from the battery cell compartment resulting from a thermal runaway event at a battery cell of the multiple battery cells within the battery cell compartment. The filter system includes a filter material configured as molecular gas sieves to filter, at least in part, the gas resulting from the thermal runaway event.

In a further aspect, a method of fabricating a battery pack is provided, which includes providing an enclosure, the enclosure including a battery cell compartment and a vent. The battery cell compartment is a sealed compartment, except for the vent, and the vent facilitates pressure-induced venting of gas from the battery cell compartment. The method also includes disposing multiple battery cells within the battery cell compartment, and associating a filter system with the enclosure. The filter system filters the pressure-induced venting of gas from the battery cell compartment resulting from a thermal runaway event at a battery cell of the one or more battery cells within the battery cell compartment. The filter system includes a filter material disposed within the battery cell compartment that is configured as molecular gas sieves to filter, at least in part, the gas resulting from the thermal runaway event at the battery cell.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
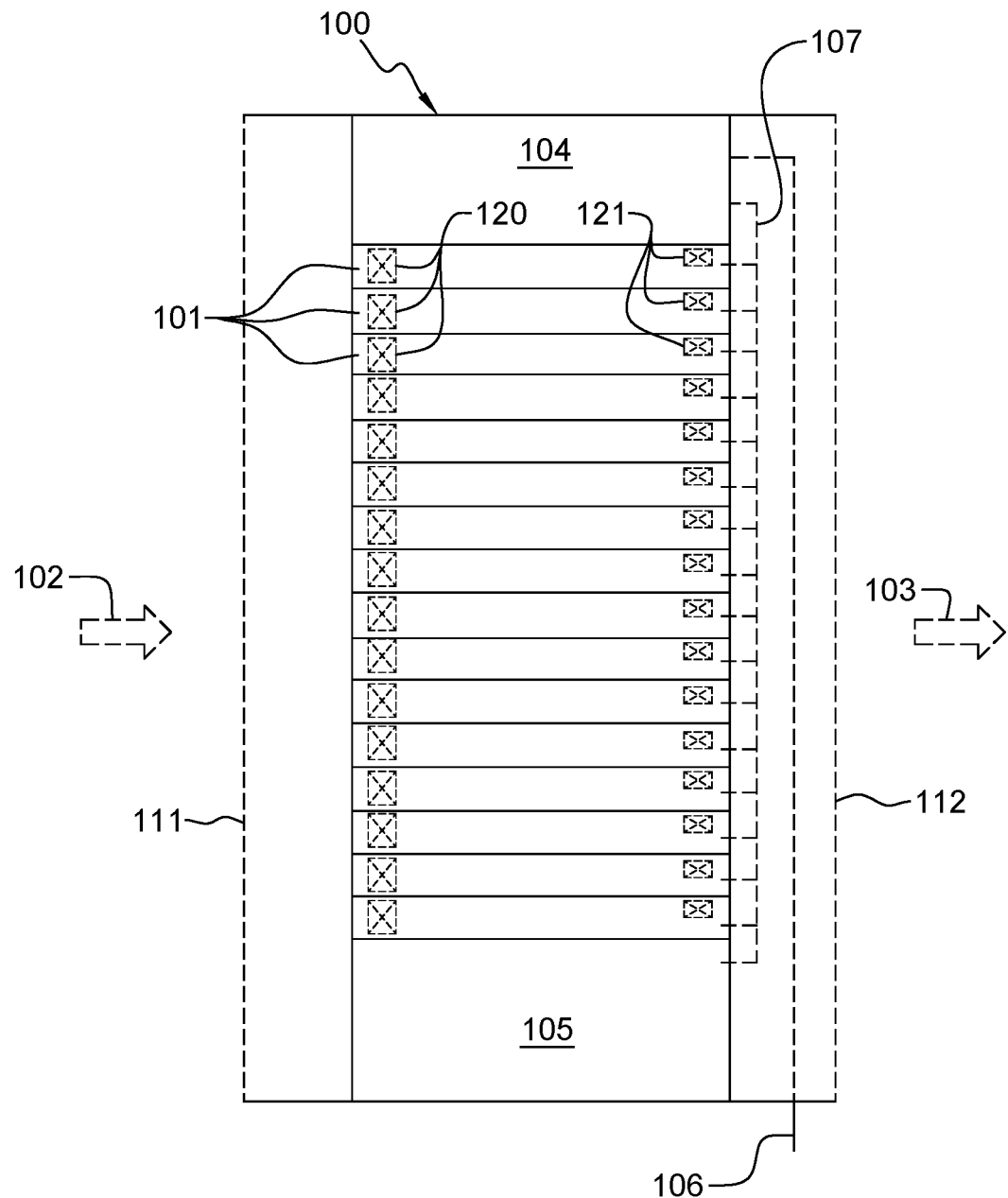
FIG. 1 is a cross-sectional elevational view of one embodiment of an air-cooled electronics rack, such as an air-cooled server rack, which can employ one or more battery packs, in accordance with one or more aspects of the present invention.

Aspects of the present invention and certain features, advantages and details thereof, are explained more fully below with reference to the non-limiting example(s) illustrated in the accompanying drawings. Descriptions of well-known systems, devices, processing techniques, etc., are omitted so as to not unnecessarily obscure the invention in detail. It should be understood, however, that the detailed description and this specific example(s), while indicating aspects of the invention, are given by way of illustration only, and not by way of limitation. Various substitutions, modifications, additions, and/or other arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application of a battery pack with pressure-induced venting and filtering, in accordance with one or more aspects of the present invention.

As noted, lithium-ion batteries are used today in many applications, including electric vehicles, mobile devices, such as tablets, laptops, portable computers, etc., as well as other electric and/or electronic systems, due to certain inherent advantages over other rechargeable battery technologies, including, for instance, a higher power density, a lower weight, a lower self-discharge, and little or no "memory" effect. Although rare, lithium-ion batteries have been known to be subject to a failure event, and can be a fire and/or thermal hazard, with the potential to even explode, and therefore can possess a safety concern to anyone or anything nearby. The chemistry of the cell, high energy density, and a flammable electrolyte, are factors that contribute to the potential for thermal runaway, which although rare, remains a concern. During thermal runaway, a lithium-ion battery can eventually reach excessively high temperatures, resulting in a rapid release of gas from the effected battery cell. A battery cell experiencing thermal runaway can vent a significant quantity of gas. For instance, 5-10 liters of gas can be released, and this gas can be malodorous, flammable, and even toxic at high concentrations. Various hydrocarbons, as well as other gases, can be constituent species of the released gas. For instance, the particular hydrocarbons emitted may depend on the state of charge of the cell at the time of thermal runaway, but could include one or more of $CH_4$, $C_2H_4$, & $C_2H_2$, $C_3H_6$, $C_2H_6$, $C_4H_8$, $C_3H_8$, as examples.

Disclosed herein is a rechargeable battery pack configured to advantageously neutralize any malodorous, toxic and/or flammable constituents of the gas produced during, for instance, a thermal runaway event at a battery cell, while also allowing for pressure release of the enclosure to reduce danger due to a pressure build up, as well as to reduce negative system effects should harmful constituents of the produced gas be allowed to directly vent from the battery pack without filtering. The battery pack is particularly advantageous for use in a closed space or room, such as a closed circuit data center, where venting of harmful gas could be dangerous to anyone within the data center and/or corrosive to other systems within the data center.

By way of example, in a data center installation, such as an air-cooled computer room, there can be multiple electronics or information technology (IT) racks disposed within rows in the data center. Air cooling within the data center is typically in a front-to-back cooling approach. Namely, according to this approach, cooled air is drawn in through a front (air inlet side) of each rack, and hot air is exhausted from a back (air outlet side) of each rack. The cooled air drawn into the front of a rack can be supplied to air inlets of the computing components (e.g., servers) disposed within the racks. The cooled air, which can be provided through one or more perforated tiles into cold air aisles of the data center, is drawn into the racks, heated and subsequently exhausted into the data center via one or more air outlets of the individual racks into hot air aisles of the data center.

FIG. 1 depicts, by way of example, one embodiment of an air-cooled electronics rack 100 with a plurality of electronic subsystems 101 being cooled. In the embodiment illustrated, electronic subsystems 101 are air-cooled by cool airflow 102 ingressing at air inlet side 111, and exhausting out air outlet side 112 as hot airflow 103. By way of example, one or more axial fan assemblies 120 can be provided at the air inlet sides of electronic subsystems 101 and/or one or more centrifugal fan assemblies 121 can be provided at the air outlet sides of electronic subsystems 101 to facilitate airflow through the individual subsystems 101 as part of the cooling apparatus of electronics rack 100. One or more of electronic subsystems 101 can include heat-generating components to be cooled of a computer system, electronics system, and/or information technology (IT) equipment. For example, one or more of electronic subsystems 101 can include one or more processors and associated memory.

Electronics rack 100 can also include, by way of example, one or more bulk power assemblies 104 of an AC to DC power supply assembly. AC to DC power supply assembly further includes, in one embodiment, a frame controller, which can be resident in bulk power assembly 104 and/or in one or more electronic subsystems 101. Also illustrated in FIG. 1 is one or more input/output (I/O) drawer(s) 105, which can also include a switch network. I/O drawer(s) 105 can include, as one example, PCI slots and disk drivers for the electronics rack.

In the depicted implementation, a three-phase AC source feeds power via an AC power supply line cord 106 to bulk power assembly 104, which transforms the supplied AC power to an appropriate DC power level for output via distribution cable 107 to the plurality of electronic subsystems 101 and I/O drawer(s) 105. The number of electronic subsystems installed in the electronics rack is variable, and depends on customer requirements for a particular system. Further, axial or centrifugal fan assemblies could alternatively, or also, reside within, for instance, bulk power assembly 104, or I/O drawer(s) 105. Again, the particular electronics rack 100 configuration of FIG. 1 is presented by way of example only, and not by way of limitation.

In one or more implementations, rechargeable battery packs, such as lithium-ion-technology-based battery packs, can be incorporated into an electronics rack, such as electronics rack 100 of FIG. 1, as backup power sources should rack power be interrupted. To facilitate safe use of the batteries in such a context, sealed battery packs are disclosed herein with filtering and pressure-induced venting. By way of example, the battery pack includes an enclosure with a battery cell compartment and a vent. The battery cell compartment is a sealed compartment, except for the vent, and the vent facilitates pressure-induced venting of gas from the battery cell compartment. One or more battery cells are disposed within the battery cell compartment, and a filter system is associated with the enclosure. The filter system filters pressure-induced venting of gas from the battery cell compartment resulting from, for instance, a thermal runaway event at a battery cell of the one or more battery cells within the battery cell compartment.

In one or more embodiments, the filter system includes a filter stage located within the battery cell compartment. This filter stage includes a filter material configured as molecular gas sieves for gas produced from the thermal runaway event at the battery cell of the one or more battery cells within the battery cell compartment. For instance, the filter material can be shaped as beads of filter material. In one or more implementations, the filter material is, or can include, a zeolite material.

In one or more implementations, gas is vented from the battery cell compartment through a vent which includes an exhaust chamber associated with the enclosure. The filter stage within the battery cell compartment is a first filter stage, and the filter system further includes a second filter stage located within the exhaust chamber. In one or more embodiments, the filter material is a first filter material and the second filter stage includes a second filter material, where the first filter material and the second filter material are different gas filter materials. In certain embodiments, the first filter material of the first filter stage within the battery cell compartment can be configured as molecular gas sieves for gas produced from the thermal runaway event, and the first filter material can surround, at least in part, the one or more battery cells within the battery cell compartment. In one or more embodiments, the first filter material is a zeolite material, and the second filter material is an activated carbon or activated charcoal material.

In one or more embodiments, due to the battery cell compartment being a sealed compartment, the battery pack can also include a cooling structure disposed, at least in part, within the battery cell compartment. The cooling structure can include, for instance, one or more heat pipes disposed within the battery cell compartment and coupled to a cooled, thermally conductive wall or surface of the enclosure. For instance, in one or more implementations, the enclosure is formed of a thermally conductive material, and the thermally conductive wall of the enclosure is an exterior sidewall of the enclosure, which itself could be coupled to or include air-cooled fins, a liquid-cooled cold rail or cold plate, etc., on the outside of the enclosure. In one or more other embodiments, the cooling structure includes one or more coolant-carrying tubes disposed within or extending through the battery cell compartment to facilitate passage of liquid coolant through the battery cell compartment. Further, in one or more embodiments, the cooling structure is in physical contact with, or coupled to, the one or more battery cells within the battery cell compartment. For instance, the cooling structure can be in physical contact with at least two adjacent battery cells of the battery cell compartment, with the multiple battery cells being disposed in one or more rows, and spaced apart lengthwise within a row in the battery cell compartment.

Advantageously, the battery packs disclosed herein can include multiple battery cells packaged in a single pack or module that is sealed, except for a pressure-activated vent. Cascading failure between battery cells is prevented by adequately spacing the cells apart within the battery pack. In one or more specific embodiments, the battery cell compartment can be filled with zeolite beads in contact with the battery cells for primary filtering of gas produced during a thermal runaway event. Pressure-induced venting of gas from the battery cell compartment can also pass through an exhaust chamber disposed between the battery cell compartment and the exterior space or environment outside the enclosure. This exhaust chamber, or ante chamber, can contain (for instance, be filled with) a second filter material, such as an activated carbon or charcoal, for secondary filtering of the gas. The exhaust chamber has one or more vent openings to the exterior battery package environment.

In one or more embodiments, the vent opening(s) into the exhaust chamber and the vent opening(s) from the exhaust chamber can be located at opposite sides of the enclosure to force the venting gas through a larger surface area of the activated carbon. The above-noted multi-stage filter system advantageously provides filtering of gases expelled during a thermal runaway event to, for instance, remove toxic, flammable, and/or malodorous constituent gases, while still allowing pressure relief of the package. Further, cooling of the battery cells can be provided by one or more cooling structures disposed within the battery cell compartment, such as one or more heat pipes in contact with the battery cells to facilitate transfer of heat away from the cells. The heat pipes can be coupled to a radiating surface at an exterior enclosure wall. In one or more other implementations, one or more coolant-carrying tubes can be disposed within the battery cell compartment to facilitate passage of liquid coolant through the battery cell compartment, and thereby cooling of the battery cells during normal operation, as well as during a thermal runaway event.

Figure 2:
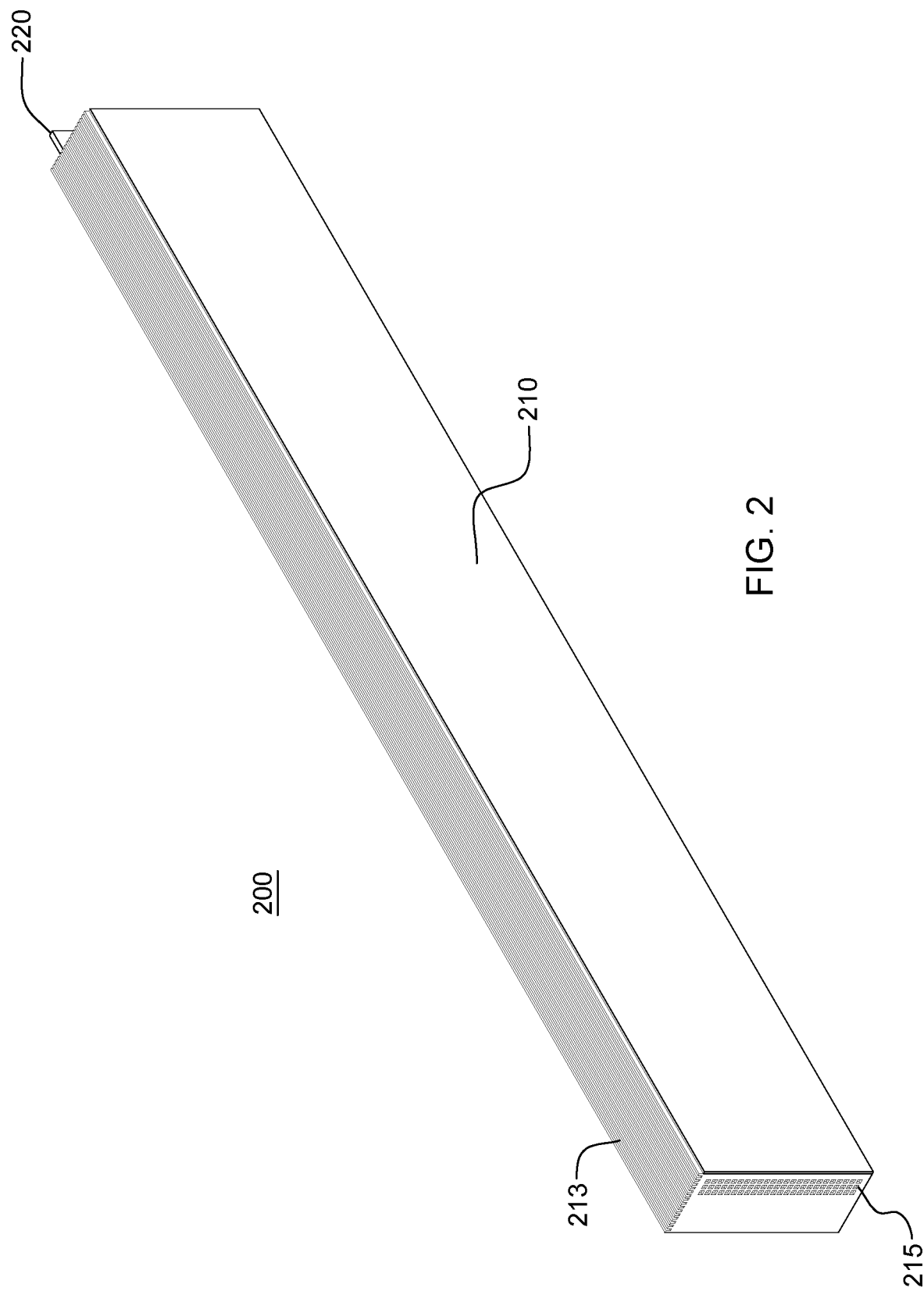
FIG. 2 depicts one embodiment of a battery pack, in accordance with one or more aspects of the present invention.
Figure 3:
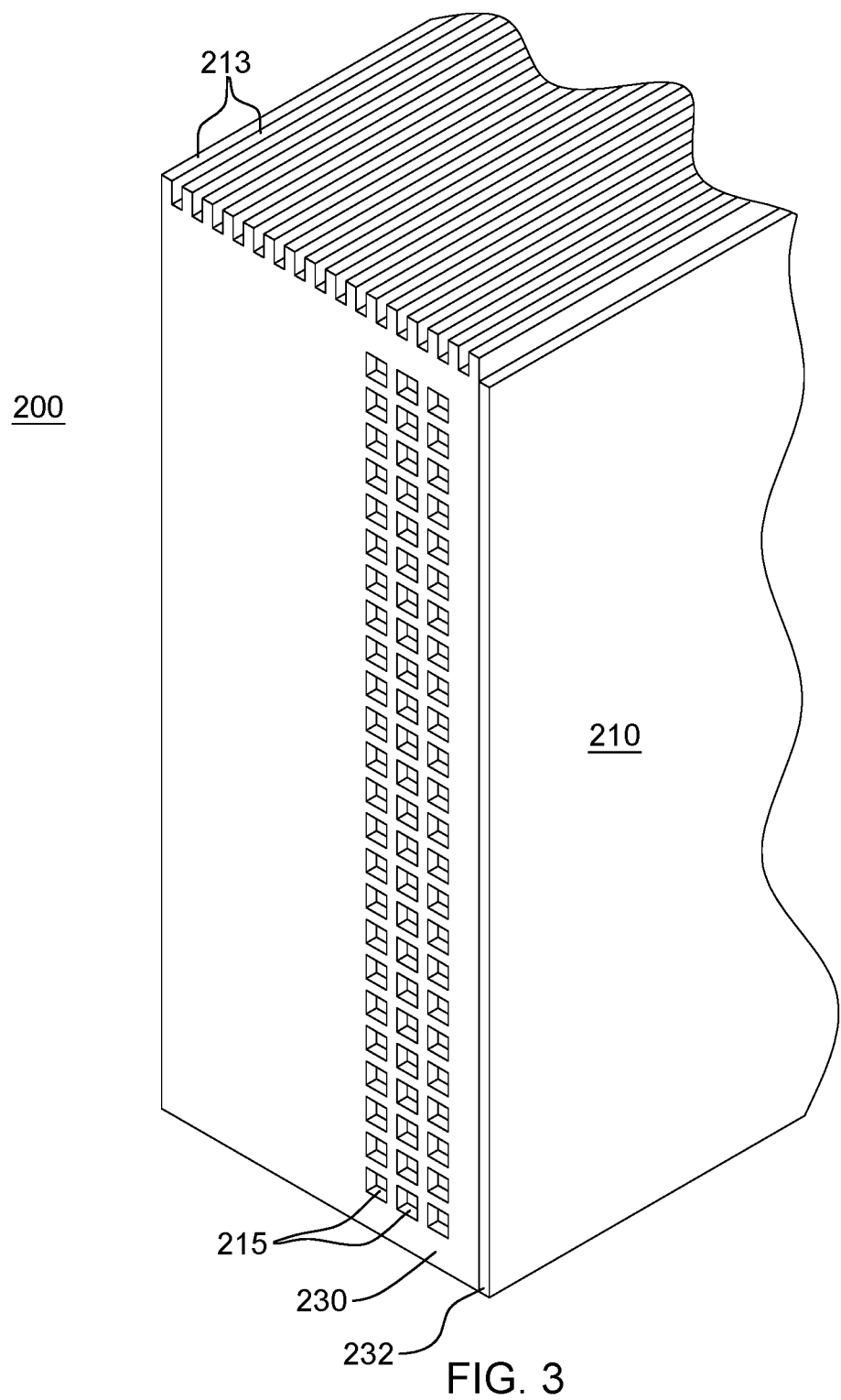
FIG. 3 is a partially enlarged view of one end of the battery pack of FIG. 2, in accordance with one or more aspects of the present invention.
Figure 4:
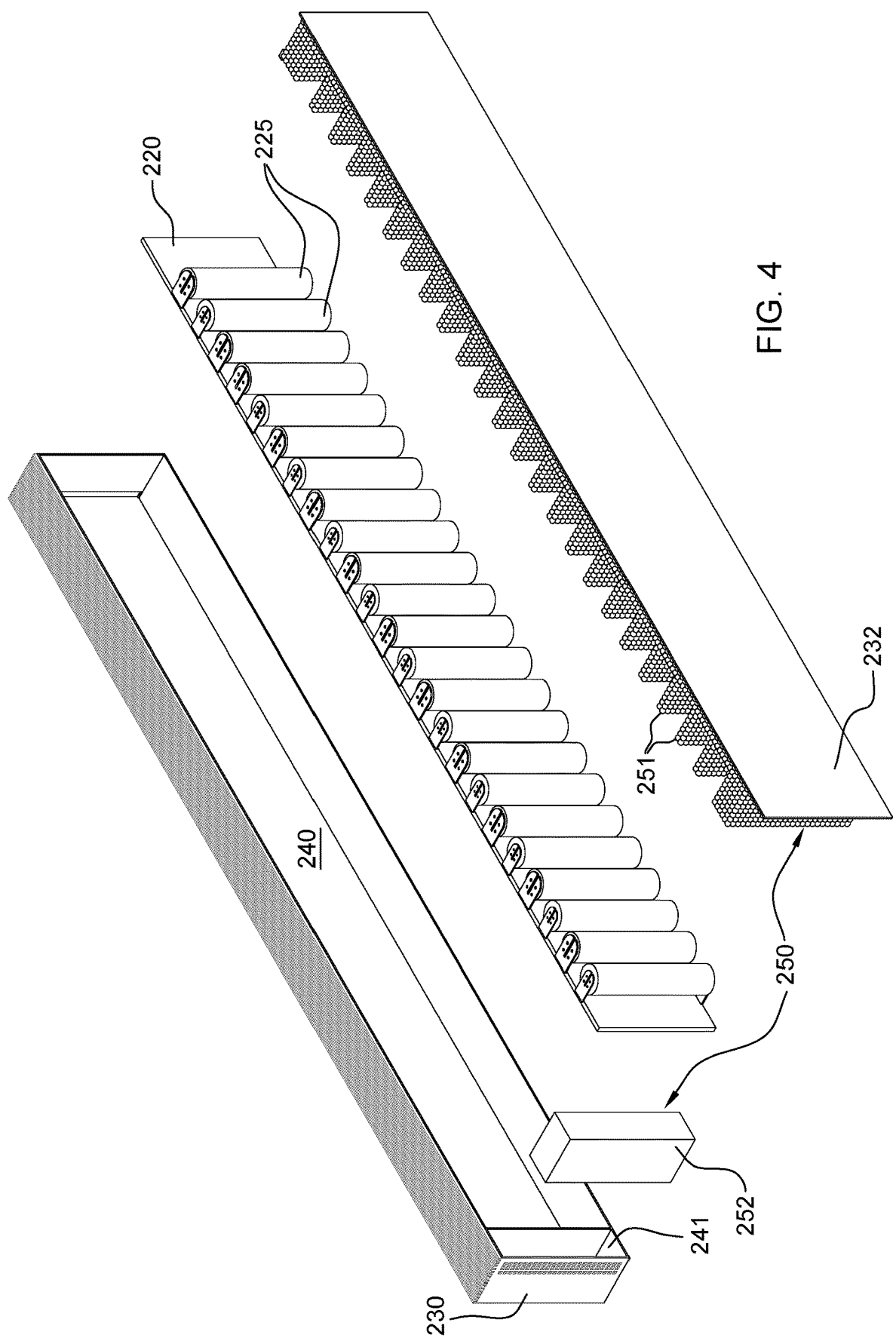
FIG. 4 is an exploded view of one embodiment of the battery pack of FIGS. 2-3, in accordance with one or more aspects of the present invention.
Figure 5:
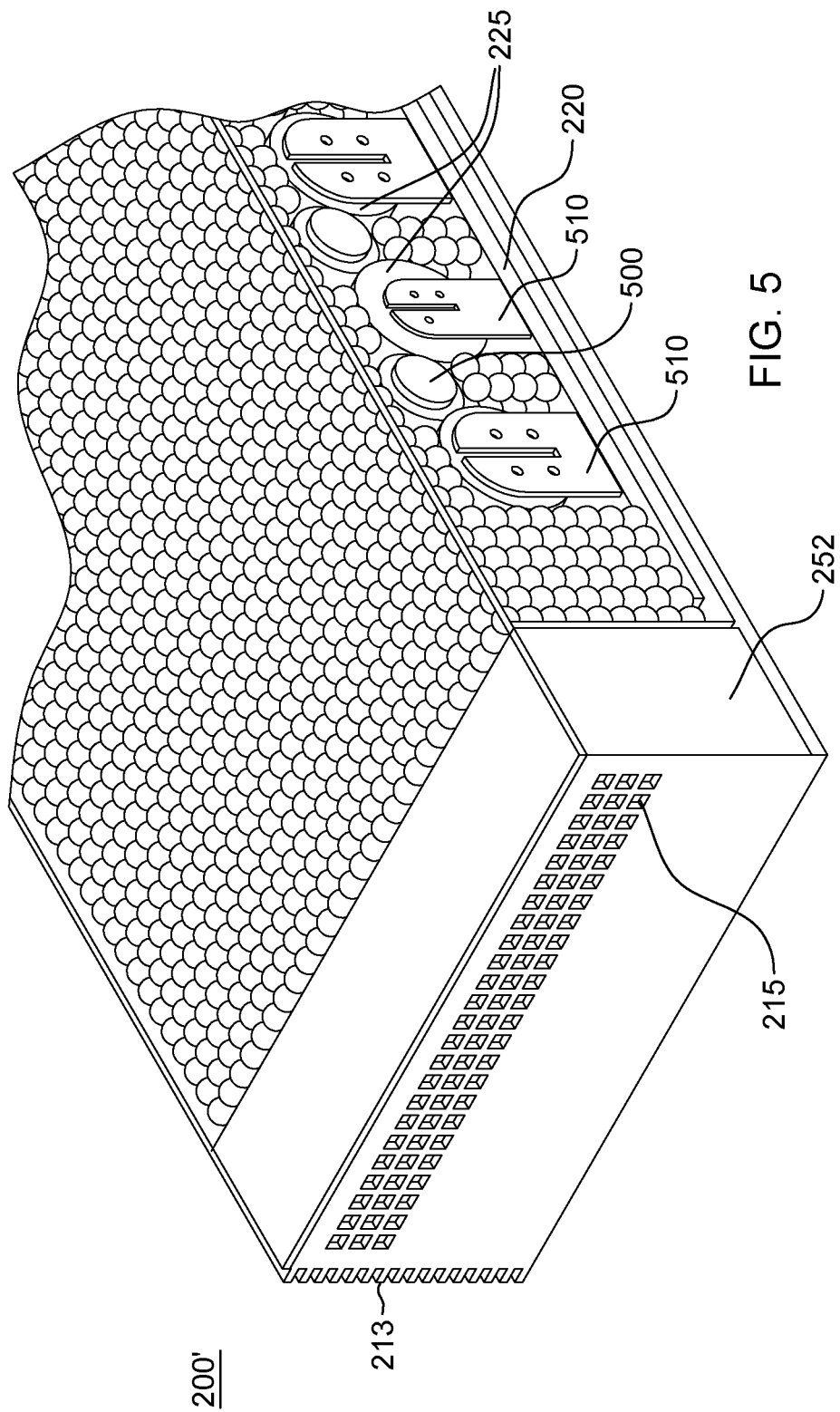
FIG. 5 depicts another embodiment of a battery pack, in accordance with one or more aspects of the present invention.

By way of specific example, FIGS. 2-4 depict one embodiment of a battery pack 200, in accordance with one or more aspects of the present invention.

Referring collectively to FIGS. 2-4, battery pack 200 includes an enclosure 210, which can be formed of a thermally conductive material, such as a metal or metal alloy. In the embodiment depicted, enclosure 200 is configured as a base container 230 (FIG. 4) with a cover 232 sealed thereto that defines a battery cell compartment 240 and an associated exhaust chamber 241, which forms part of a vent for battery cell compartment 240. The battery cell compartment is a sealed compartment sized to accommodate a circuit board 220, such as a printed circuit board, and one or more rechargeable battery cells 225, which can be mechanically coupled via support brackets to circuit board 220 in a spaced relation such as illustrated, for instance, in FIG. 4. This is to limit possible cascading of a thermal event. Further, battery cells 225 are electrically coupled to circuit board 220, with circuit board extending, in part, from enclosure 210, as illustrated, by way of example, in FIG. 2. In this manner, circuitry associated with circuit board 220 can facilitate the charging and discharging of rechargeable battery cells 225 within the enclosure, as well as the providing of power to one or more systems outside the battery pack.

As noted, in one or more embodiments, enclosure 210 includes a vent that facilitates pressure-induced venting of gas from battery cell compartment 240 through, for instance, exhaust chamber 241. In particular, one or more inner or intermediate vent openings (not shown) are provided from battery cell compartment 240 to exhaust chamber 241, and one or more outer vent openings 215 are provided from exhaust chamber 241 to the exterior battery pack environment, such as to a larger electronic system or subsystem being powered by battery pack 200. Note that the number and position of the vent openings into and from exhaust chamber 241 can vary as desired for a particular application.

In one or more embodiments, a multi-stage gas filter system 250 is associated with enclosure 210. The multi-stage filter system 250 includes a first filter stage within battery cell compartment 240, which includes a first filter material 251, and a second filter stage within exhaust chamber 241, which includes a second filter material 252. By way of example, the first filter material can be configured as molecular gas sieves designed to filter specific gas constituents resulting from a thermal runaway event at a battery cell 225 within battery cell compartment 240, and the second filter material can be a general gas filter material. In the embodiment depicted, the first filter material 251 is configured as beads, or other small geometric shapes of material, which can substantially fill available space within the battery cell compartment 240 when battery pack 200 is assembled. By way of example, the first filter material is, or includes, a zeolite material, which can be formed as beads. The zeolite beads are non-conductive and can be selected to provide primary filtering of known dangerous gases released during a thermal runaway event. In operation, vented gas from a thermal runaway event is forced by a buildup in pressure within the battery cell compartment through the first filter material, and then through the intermediate vent openings into the exhaust chamber, where it passes through the second filter material 252 to reach the outer vent openings 215 from exhaust chamber 241. In one or more embodiments, the second filter material can be an activated carbon or activated charcoal. Vented gas is forced through the activated carbon by pressure resulting from the thermal runaway event, and exits into the environment after the toxic, flammable and/or malodorous constituents within the gas have been removed, or at least greatly reduced.

As noted, in one or more embodiments, the primary or first filter material within the battery cell compartment is, or includes, zeolite. Zeolite, or zeolite material, are microporous materials which are, or function as, molecular gas sieves. The material, for instance, formed as beads, or other structures, absorbs gas molecules of particular sizes to which the zeolite or molecular sieve is tuned. In one or more embodiments, the gas being emitted from a battery cell during a thermal runaway event is known ahead of time, and the zeolite material is selected to absorb particular constituents of that gas, as desired. In the micro-porous zeolite material, a gas of certain molecular structure can be trapped by the material. A variety of hydrocarbons have been tested against zeolite material, such as ZSM-5 and Silicalite. As is known in the art, a zeolite-containing material can be provided to absorb a wide variety of constituent gases. These materials can include, for instance, Ru(II) complex/zeolite, methylene blue/zeolite, LiCl/zeolites, zeolites/quartz crystal microbalance, zeolite/surface-acoustic-wave, zeolite/microcantilever, zeolite/cantilever, proton conductive zeolites, $Na^+$ ion conducting ZSM-5, and zeolite conductive. Thus, the zeolite (or zeolite-containing material) can be selected to remove particular constituent gases from the gas being emitted due to a thermal runaway event at one or more of the battery cells within the battery cell compartment. Note in this regard that combinations of zeolite material can also be provided within the battery cell compartment, in order to filter or entrap a variety of constituent gasses released from a battery cell during a thermal runaway event. Note also that molecular sieve materials such as zeolite are ceramic, and therefore, have a very high resistance to heat, which allows the zeolite material to reside within the battery cell compartment, and to facilitate filtering of gas resulting from a thermal runaway event within the battery cell compartment.

In addition to the primary filtering performed by the first filter material 251, the second filter material 252 is provided as a general filter to further ensure filtering of unwanted gases from release from the battery pack. In one or more embodiments, the second filter material is an activated carbon or charcoal, which has a very large surface area relative to volume due to the numerous microscopic pores within the material. The micro-porosity makes the activated carbon or charcoal an excellent gas filter that can readily remove or filter odors and hydrocarbons from a gas being emitted from the battery cell compartment.

As noted, in one or more embodiments, the battery cell compartment is a sealed compartment, except for the vent opening(s) into the exhaust chamber 241. The battery cell compartment 240 can be sealed by appropriately sealing cover 232 to base container 230 using, for instance, an epoxy sealant. Similarly, circuit board 220 can be sealed where extending from enclosure 210.

As shown in FIG. 2-4, one or more exterior surfaces of enclosure 210 can include air-cooled fins 213 extending from the surface to facilitate cooling of the battery cells 225 sealed within battery cell compartment 240. Note that multiple exterior surfaces of enclosure 210 could include air-cooled fins 213, if desired. In one or more other embodiments, one or more exterior surfaces of enclosure 210 could be coupled to a liquid-cooled structure, such as a liquid-cooled cold rail or cold plate, to facilitate liquid removal of heat conducted from the battery cell compartment 240 to the surface of enclosure 210.

By way of further example, FIGS. 5-8 depict another embodiment of a battery pack 200', in accordance with one or more aspects of the present invention.

Referring collectively to FIGS. 5-8, battery pack 200' is similar to battery pack 200 described above in connection with FIGS. 2-4 including, by way of example, enclosure 210, with a battery cell compartment 240 and an associated exhaust chamber 241, which forms part of a vent for battery cell compartment 240. Battery cell compartment 240 also includes circuit board 220 with a plurality of rechargeable batteries 225, which are mechanically coupled via support brackets 510 to circuit board 220. As shown, battery cells 225 are spaced apart to reduce possible cascading in the event of a thermal runaway event. The battery cells are also electrically connected to circuit board 220 to facilitate charging and discharging of the cells via circuitry associated with or coupled to the circuit board.

As with battery pack 200, battery pack 200' further includes a multi-stage filter system, with first filter stage within battery cell compartment 240 that includes a first filter material 251, and a second filter stage within exhaust chamber 241, which includes a second filter material 252. By way of example, first filter material 251 can be configured as molecular gas sieves designed to filter specific gas constituents produced from a thermal runaway event at a battery cell 225 within battery cell compartment 240, and the second filter material can be a general gas filter material. In the embodiment depicted, first filter material 251 is configured as beads, or other small geometric shapes of material, which can substantially fill available space within the battery cell compartment 240 when battery pack 200' is assembled. By way of example, the first filter material is a zeolite material, which can be formed as beads. The zeolite material is selected to provide primary filtering of dangerous gas constituents released from a battery cell during a thermal runaway event. The second filter material can be, by way of example, an activated carbon or activated charcoal, which provides general filtering of any pressure-induced venting of gas from the battery cell compartment through the exhaust chamber.

As explained above, in operation, vented gas from a thermal runaway event is forced by a buildup of pressure within the battery cell compartment through the first filter material, and then through intermediate vent openings into the exhaust chamber, where it then passes through the second filter material to reach the outer vent openings 215 from the exhaust chamber, from which the gas vents. By appropriately selecting the zeolite material(s), harmful gas constituents resulting from a thermal runaway event can be filtered via the zeolite material, and active carbon material, before being vented from the battery pack.

Figure 6:
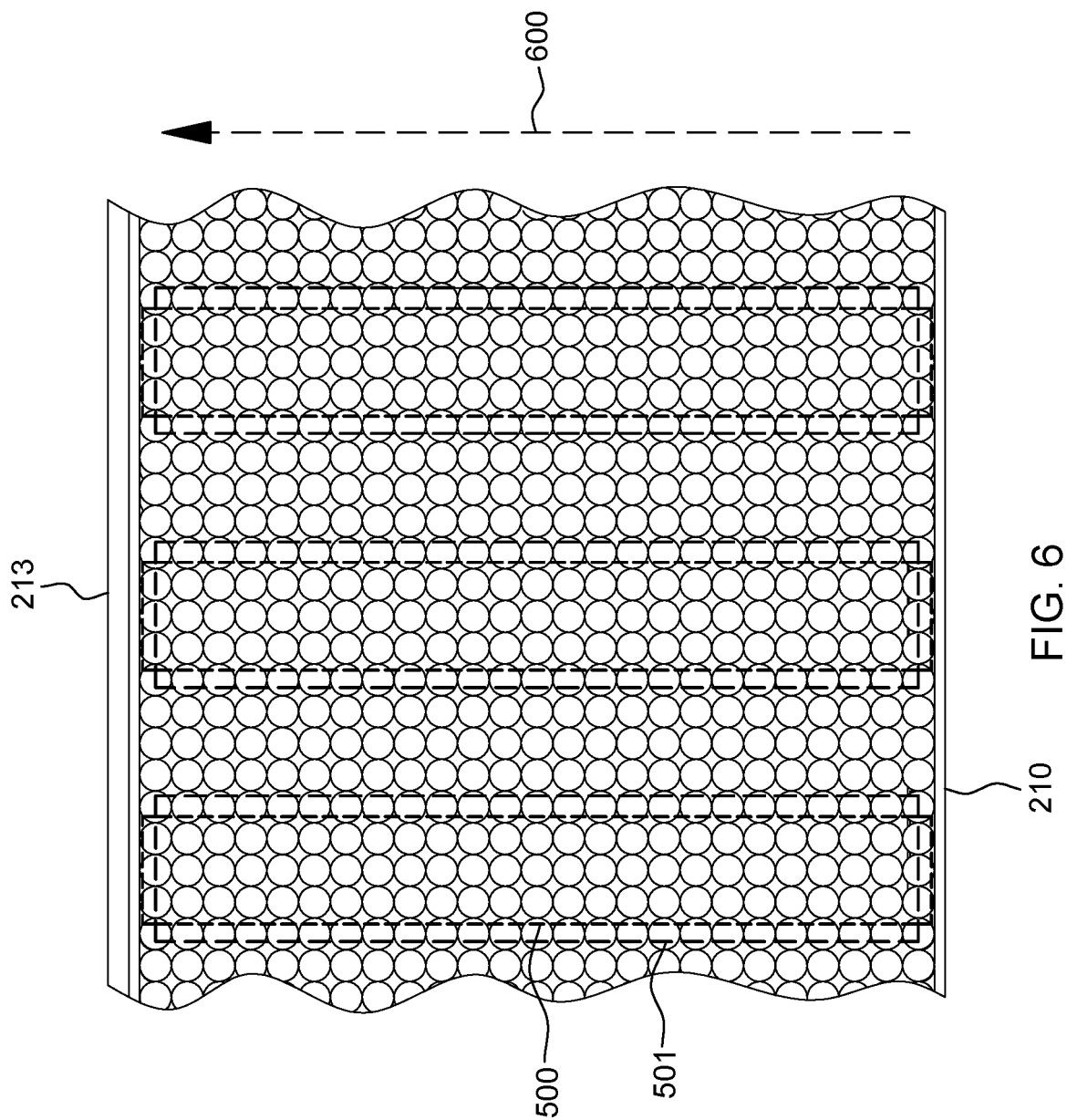
FIG. 6 is a partial top plan view of the battery pack embodiment of FIG. 5, in accordance with one or more aspects of the present invention.
Figure 7:
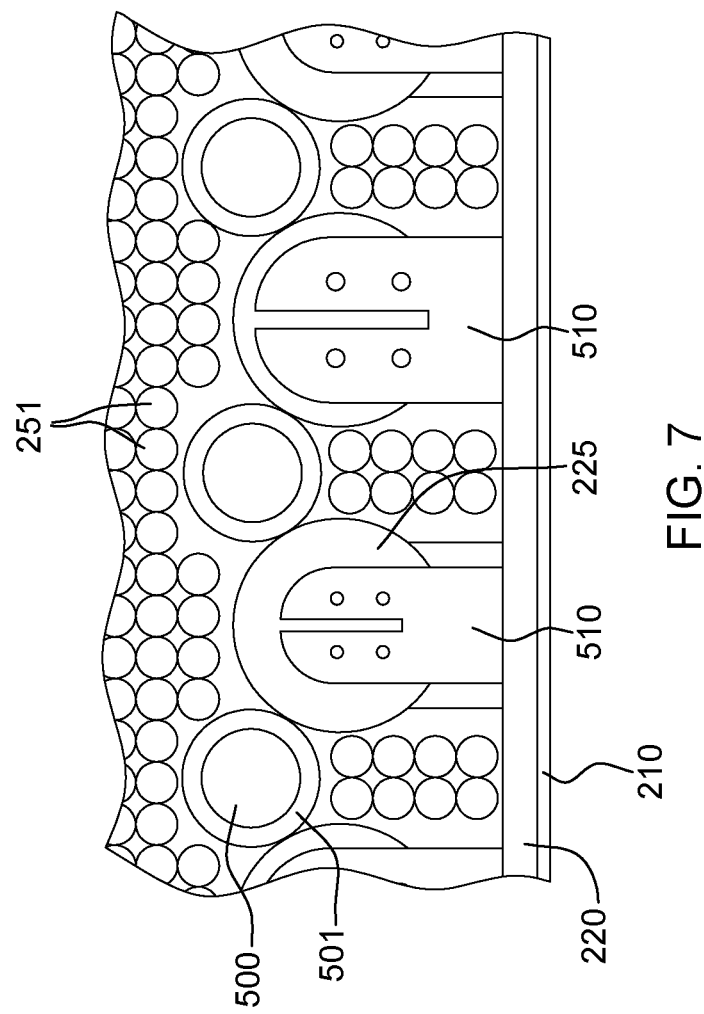
FIG. 7 is an enlarged, partial cross-sectional view of the battery pack embodiment of FIGS. 5-6, in accordance with one or more aspects of the present invention.

In the implementation of FIGS. 5-8, battery cell compartment 240 is again a sealed compartment, with the exception of the vent that allows for pressure-induced venting of gas from the battery cell compartment. As such, a cooling structure, such as heat pipes 500, each wrapped in a thermal interface material 501, can be provided within battery cell compartment 240 to facilitate removal of heat from the battery cell compartment during normal operation, as well as during a thermal runaway event. As illustrated in FIGS. 6 & 7, multiple heat pipes 500 can be provided, each in physical contact lengthwise with one battery cell, or with two adjacent rechargeable battery cells, of battery cells 225 disposed within battery cell compartment 240. The heat pipes are configured to transmit heat from the battery cells in a direction 600 towards a thermally conductive wall or surface of enclosure 240 which includes, for instance, air-cooled fins 213, or a liquid-cooled cold rail or cold plate coupled to the surface of the enclosure. Note that any number of heat pipes can be used within the battery cell compartment to facilitate cooling within the compartment. Further, the heat pipes can be wrapped with an appropriate thermal interface material to provide better thermal contact between the heat pipe(s) and the respective rechargeable battery cell(s). Heat flows from the heat pipes to a cooling surface, for instance, a surface with fins, or other radiative surface, which assists in removing the heat from the compartment. Advantageously, the use of heat pipes allows the battery pack to be sealed, with the exception of the filtered gas vents.

In one or more other embodiments, the cooling structure could include one or more coolant-carrying tubes disposed within or extending through the battery cell compartment to facilitate the passage of liquid coolant through the battery cell compartment. For instance, the coolant-carrying tube could extend into, through and out from the battery cell compartment in any desired configuration. Further, a liquid-cooled cold plate could be incorporated into the battery cell compartment and disposed over and in physical contact with the one or more battery cells of the battery cell compartment.

Advantageously, the cooling structure, whether being, or including, one or more heat pipes, coolant-carrying tubes, cold rails, cold plates, etc., facilitates cooling the battery cells in normal operation, as well as cooling any gas produced as a result of a thermal runaway event within the battery cell compartment.

Figure 8:
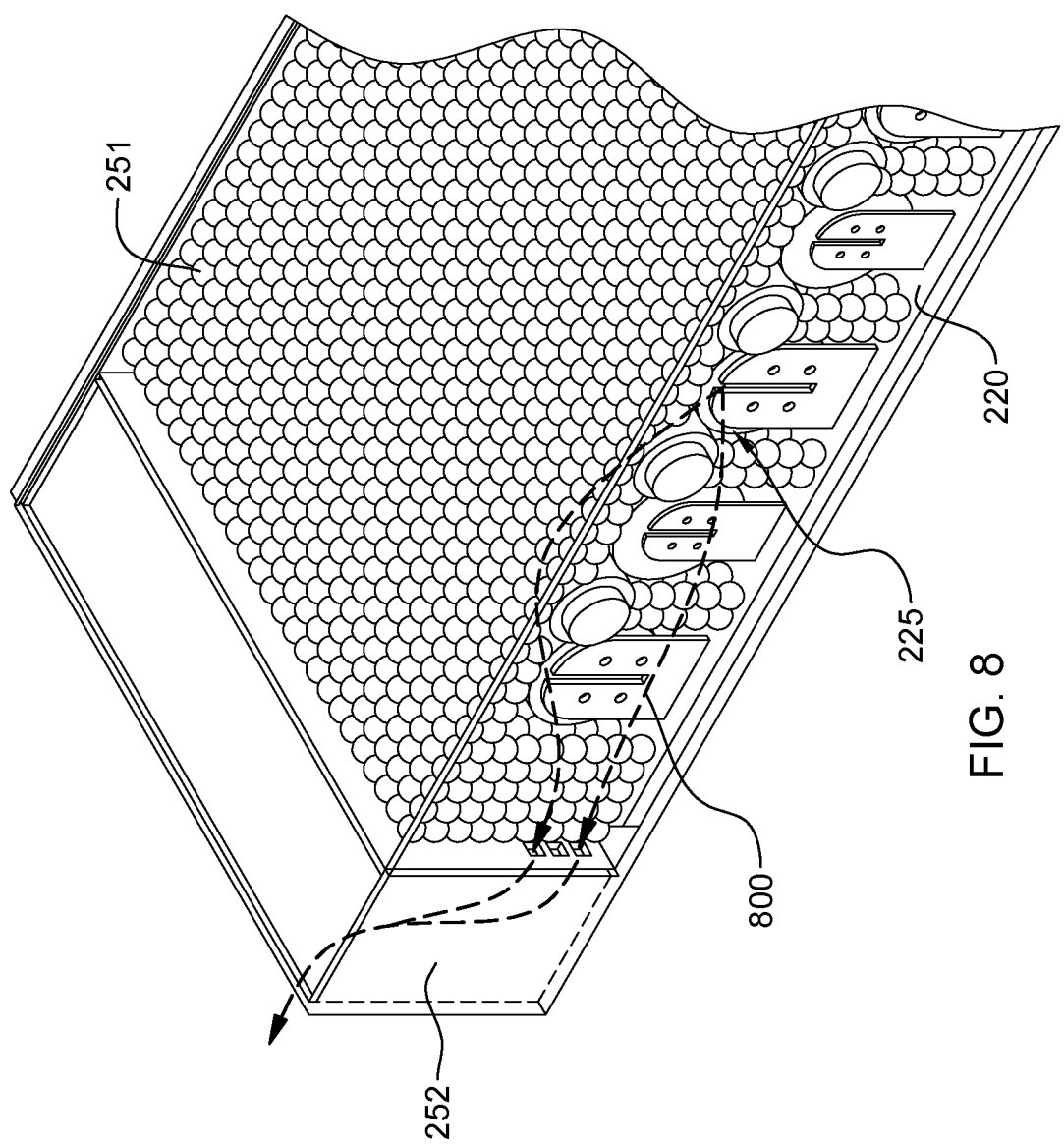
FIG. 8 depicts the battery pack embodiment of FIGS. 5-7, and illustrates filtering and pressure-induced venting of gas from a battery cell due to a thermal runaway event, in accordance with one or more aspects of the present invention.

FIG. 8 represents a rapid buildup of pressure within the battery cell compartment due to a release of gas resulting from a thermal runaway event at a battery cell within the battery cell compartment. As illustrated, the gas 800 passes through the first filter material, such as zeolite material, which functions as a primary filter, as well as assists in cooling the released gas. Due to pressure buildup within the compartment, the filtered gas is forced through the intermediate vent opening(s) into the exhaust chamber, where it passes through the second filter material, for instance, activated carbon material, before being released from the battery pack. Thus, the pressure-induced release of gas is filtered so that gas exits into the surrounding environment after, for instance, any toxic, flammable, and other malodorous constituents have been removed.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A battery pack comprising:
   an enclosure, the enclosure including a battery cell compartment and a vent, the battery cell compartment being a sealed compartment, except for the vent, and the vent facilitating pressure-induced venting of gas from the battery cell compartment;
   one or more battery cells disposed within the battery cell compartment; and
   a filter system associated with the enclosure, the filter system filtering pressure-induced venting of gas from the battery cell compartment resulting from a thermal runaway event at a battery cell of the one or more battery cells within the battery cell compartment, and the filter system including:
   a filter material shaped as a plurality of beads which are dispersed throughout the battery cell compartment and fill available space within the battery cell compartment, surrounding the one or more battery cells within the battery cell compartment.

2. The battery pack of claim 1, wherein the filter material is a filter stage located within the battery cell compartment.

3. The battery pack of claim 2, wherein the beads are molecular gas sieves for gas produced during the thermal runaway event at the battery cell of the one or more battery cells within the battery cell compartment.

4. The battery pack of claim 3, wherein the filter material comprises a zeolite material.

5. The battery pack of claim 2, wherein the vent vents gas from the battery cell compartment through an exhaust chamber of the enclosure, and wherein the filter stage within the battery cell compartment is a first filter stage, and the filter system further includes a second filter stage located within the exhaust chamber.

6. The battery pack of claim 5, wherein the filter material of the first filter stage is a first filter material, and the second filter stage comprises a second filter material, the first filter material and the second filter material being different gas filter materials.

7. The battery pack of claim 6, wherein the beads within the battery cell compartment are molecular gas sieves for gas produced during the thermal runaway event at the battery cell.

8. The battery pack of claim 6, wherein the first filter material comprises a zeolite material, and the second filter material comprises an activated carbon material.

9. The battery pack of claim 1, wherein the battery pack includes multiple battery cells disposed within the battery cell compartment, the one or more battery cells being one or more battery cells of the multiple battery cells, and wherein the battery pack further comprises a cooling structure disposed, at least in part, within the battery cell compartment, the beads filling available space within the battery cell compartment, including surrounding the cooling structure.

10. The battery pack of claim 9, wherein the enclosure is formed of a thermally conductive material, and the cooling structure comprises one or more heat pipes disposed within the battery cell compartment and coupled to a thermally conductive wall of the enclosure to facilitate removal of heat from the one or more battery cells to the thermally conductive wall of the enclosure.

11. The battery pack of claim 9, wherein the cooling structure comprises one or more coolant-carrying tubes within the battery cell compartment connected to facilitate passage of liquid coolant through the battery cell compartment.

12. The battery pack of claim 9, wherein the cooling structure is in physical contact lengthwise with at least two adjacent battery cells of the multiple battery cells within the battery cell compartment, the multiple battery cells being spaced apart within the battery cell compartment.

13. A battery pack comprising:
an enclosure, the enclosure including a battery cell compartment and a vent, the battery cell compartment being a sealed compartment, except for the vent, and the vent facilitating pressure-induced venting of gas from the battery cell compartment;
a circuit board;
multiple battery cells mounted spaced apart to the circuit board within the battery cell compartment; and
a filter system associated with the enclosure, the filter system to filter the pressure-induced venting of gas from the battery cell compartment resulting from a thermal runaway event at a battery cell of the multiple battery cells within the battery cell compartment, the filter system including a filter material configured as molecular gas sieves to filter, at least in part, the gas resulting from the thermal runaway event, the filter material being shaped as a plurality of beads which are dispersed throughout the battery cell compartment and fill available space within the battery cell compartment, surrounding the one or more battery cells within the battery cell compartment.

14. The battery pack of claim 13, wherein the filter material comprises a zeolite material.

15. The battery pack of claim 13, wherein the vent vents gas from the battery cell compartment through an exhaust chamber of the enclosure, and the filter system further includes another filter material disposed within the exhaust chamber of the enclosure, the filter material and the another filter material being different gas filter materials.

16. The battery pack of claim 15, wherein the filter material comprises a zeolite material, and the another filter material comprises an activated carbon material.

17. A method of fabricating a battery pack comprising:
providing an enclosure, the enclosure including a battery cell compartment and a vent, the battery cell compartment being a sealed compartment except for the vent, and the vent facilitating pressure-induced venting of gas from the battery cell compartment;
providing a circuit board;
mounting multiple battery cells spaced apart to the circuit board within the battery cell compartment; and
associating a filter system with the enclosure, the filter system to filter the pressure-induced venting of gas from the battery cell compartment resulting from a thermal runaway event at a battery cell of the one or more battery cells within the battery cell compartment, and the filter system including a filter material disposed within the battery cell compartment configured as molecular gas sieves to filter, at least in part, the gas resulting from the thermal runaway event at the battery cell, the filter material being shaped as a plurality of beads which are dispersed through the battery cell compartment and fill available space within the battery cell compartment, surrounding the one or more battery cells within the battery cell compartment.

\* \* \* \* \*